(12) United States Patent
Turnaus et al.

(10) Patent No.: US 9,909,679 B2
(45) Date of Patent: Mar. 6, 2018

(54) VALVE HAVING ELECTRO-MECHANICAL ACTUATOR AND A CONTROL DEVICE WITH A DELAY CIRCUIT

(71) Applicant: FESTO AG & Co. KG, Esslingen (DE)

(72) Inventors: Wolfram Turnaus, Plochingen (DE); Philippus Hartmann, Wildberg (DE); Ralf Forcht, Wendlingen (DE)

(73) Assignee: FESTO EG & CO. KG, Esslingen (DE)

( * ) Notice: Subject to any disclaimer, the term of this patent is extended or adjusted under 35 U.S.C. 154(b) by 0 days.

(21) Appl. No.: 15/101,143

(22) PCT Filed: Nov. 12, 2014

(86) PCT No.: PCT/EP2014/003031
§ 371 (c)(1),
(2) Date: Jun. 2, 2016

(87) PCT Pub. No.: WO2015/082038
PCT Pub. Date: Jun. 11, 2015

(65) Prior Publication Data
US 2016/0305568 A1   Oct. 20, 2016

(30) Foreign Application Priority Data
Dec. 3, 2013 (DE) .......................... 10 2013 020 309

(51) Int. Cl.
*F16K 31/02* (2006.01)
*F16K 31/44* (2006.01)
(Continued)

(52) U.S. Cl.
CPC .............. *F16K 31/02* (2013.01); *F15B 21/02* (2013.01); *F15B 21/10* (2013.01); *F16K 31/44* (2013.01);
(Continued)

(58) Field of Classification Search
CPC ...... F16K 31/02; F16K 31/44; F15B 15/2014; F15B 21/02; F15B 21/10; H01F 7/1816
See application file for complete search history.

(56) References Cited

U.S. PATENT DOCUMENTS

| 4,522,221 A | * | 6/1985 | Chivens et al. | .......... E04H 4/16 137/118.07 |
| 6,702,250 B2 | * | 3/2004 | Czimmek | ................ F01L 9/04 123/446 |

(Continued)

FOREIGN PATENT DOCUMENTS

| DE | 1084532 | 6/1960 |
| DE | 3800399 | 9/1988 |

(Continued)

*Primary Examiner* — Kevin Lee
(74) *Attorney, Agent, or Firm* — Hoffmann & Baron, LLP

(57) ABSTRACT

A valve device having a valve housing, through which passes a fluid channel, in which are formed a valve seat and a valve member which is accommodated such that it can be moved relative to the valve seat, having an electromechanical actuator for moving the valve member between at least two functional positions in order to influence a free cross-section of the fluid channel, and having a control device, which is designed for activating the actuator depending on a control signal and includes a delay circuit which, in the case of the valve being switched off, is designed for a time-delayed movement of the valve member into a switch-off position. The delay circuit includes an electrical energy store which, in the case of the valve being switched off, is designed for energy-independent movement of the valve member into the switch-off position.

12 Claims, 3 Drawing Sheets

(51) Int. Cl.
    *F15B 21/02*     (2006.01)
    *F15B 21/10*     (2006.01)
    *H01F 7/18*     (2006.01)
    *F15B 13/043*     (2006.01)
    *F15B 21/00*     (2006.01)
    *F15B 15/20*     (2006.01)

(52) U.S. Cl.
    CPC .......... *H01F 7/1816* (2013.01); *F15B 13/043* (2013.01); *F15B 15/204* (2013.01); *F15B 21/005* (2013.01); *H01F 7/1844* (2013.01)

(56) References Cited

U.S. PATENT DOCUMENTS

| | | | |
|---|---|---|---|
| 8,118,058 B2 * | 2/2012 | Cook et al. ......... | F15B 13/0402 137/625.64 |
| 8,944,096 B2 * | 2/2015 | Conrad ................ | G05D 7/0635 128/204.18 |

FOREIGN PATENT DOCUMENTS

| | | |
|---|---|---|
| DE | 102008027544 | 12/2009 |
| EP | 1809935 | 10/2013 |
| EP | 2644904 | 10/2013 |

\* cited by examiner

VALVE HAVING ELECTRO-MECHANICAL ACTUATOR AND A CONTROL DEVICE WITH A DELAY CIRCUIT

This application claims priority based on an International Application filed under the Patent Cooperation Treaty, PCT/EP2014/003031, filed Nov. 12, 2014, which claims priority to DE102013020309.0, filed Dec. 3, 2013.

BACKGROUND OF THE INVENTION

The invention relates to a valve device with a valve housing, through which passes a fluid passage, in which are formed a valve seat and a valve member accommodated so that it may be moved relative to the valve seat, with an electro-mechanical actuating means for moving the valve member between at least two functional positions in order to influence a cross-section of the fluid passage, and with a control device which is adapted to activate the actuating means on the basis of a control signal and which includes delay means which, in connection with a valve switch-off process, are adapted for delayed-action movement of the valve member into a switch-off position.

According to prior art, a valve device is known which is provided for use in process plant such a chemical or bio-reactors, or in machining centres such as lathes or milling centres. The known valve device is used to provide a fluid flow, in particular a compressed air flow, to a fluidic load, in particular an actuator, connected to the valve device. The fluid flow should also be maintained for a certain period of time after switch-off of a central controller such as for example a programmable control system adapted to control the valve device and the entire process plant or machining centre. Because of this pressurisation of the fluidic load beyond the actual period of use, it is possible to ensure for example a rinsing process for the fluidic load after switch-off of the process plant or machining centre. This rinsing process is used for example to prevent undesired penetration of cleaning fluids into areas of the fluidic load under fluid pressure. The known valve device includes for this purpose a pneumatic timer which is activated after switch-off of an electrical supply voltage provided to the valve device during regular operation and, after a presettable period of time has elapsed, ensures a purely pneumatic movement of the assigned valve member into a switch-off position.

SUMMARY OF THE INVENTION

The problem of the invention is to provide a valve device with which the valve switch-off process can be carried out more precisely.

This problem is solved, for a valve device of the type described above, by the following features: A valve device with a valve housing, through which passes a fluid passage, in which are formed a valve seat and a valve member accommodated so that it may be moved relative to the valve seat, with an electro-mechanical actuating means for moving the valve member between at least two functional positions in order to influence a cross-section of the fluid passage, and with a control device which is adapted to activate the actuating means on the basis of a control signal and which includes delay means which, in connection with a valve switch-off process, are adapted for delayed-action movement of the valve member into a switch-off position, wherein the control device and the delay means are adapted as electrical circuits and include an electrical energy storage which, in the case of a valve switch-off process, is adapted for an energy-autarkic movement of the valve member into the switch-off position.

Due to the design of the control device and the delay means as electrical circuits, and also the assignment of an electrical energy storage to these electrical circuits, it is possible to provide a delayed activation of the electro-mechanical setting means which is exactly presettable and on the other hand substantially independent of environmental conditions. In contrast to the known valve device, for example boundary conditions such as supply pressure for the valve device and/or ambient temperature play no significant role in the valve switch-off process. The electrical energy storage is provided to ensure electrical energy for operation of the control device and/or the delay means and for activation of the electro-mechanical actuating means during the valve switch-off process. For the valve switch-off process it is assumed that a power supply for the valve device has already been interrupted, so that there is no energy supplied from outside. The amount of energy stored by the electrical energy storage is so dimensioned such that the amount of energy required or the processing operations in the control device needed to carry out the valve switch-off process and/or the amount of energy required by the delay means, also the amount of energy necessary for operation of the actuating means to achieve the switch-off position for the valve member may be provided.

It is expedient if the control device is adapted to provide a start signal to the delay means on receiving a switch-off control signal or in the absence of a control signal and/or during switch-off of a supply voltage, in order to initiate the valve switch-off process. In a normal operating state, the control device has the task of receiving control signals from a higher-level control unit, in particular a programmable control system, via direct wiring or a bus system and, depending on the control signals received, moving the electro-mechanical actuating means in such a way that the cross-section of the fluid passage is adjusted by the valve member so that for example a presettable pressure is provided to a fluidic load connected to the valve device and/or a presettable fluid flow passes through the connected fluidic load. Accordingly, the control device includes an electrical or electronic circuitry part which is adapted to receive the control signals and to process them into suitable actuating signals for the electro-mechanical actuating means. This circuitry part also includes a detection device which is adapted to recognise a switch-off control signal sent by the higher-level control unit, and from this to generate a start signal for the delay means. As an alternative or in addition to this it may be provided for the circuitry part of the control device to send a start signal to the delay means if, after a presettable period of time has elapsed since the last valid control signal, no further valid control signal has been received from the higher-level control unit and/or if a supply voltage for the valve device has been switched off. With the aid of the start signal, the delay means are activated so that, after the occurrence of a presettable switch-off condition, the desired movement of the valve member into the switch-off position by the electro-mechanical actuating means is achieved, thereby setting a subsequent standby state for the valve device.

In a development of the invention it is provided that the delay means include a measuring device, which is adapted to provide a switch-off signal to the control device in the presence of a presettable measurement result. Here the measuring device may be adapted to detect one or more measured values which, in isolation from one another or in presettable combination with one another, lead to output of the switch-off signal by the delay means.

Preferably it is provided that the control device and/or the delay means are assigned setting means which are adapted for setting the presettable measurement result for provision of a switch-off signal. The setting means may be adapted for local setting of the presettable measurement result to the valve device, in particular in the form of DIP switches or a coding plug. Accordingly a user may set the valve device, by suitable manipulation of the DIP switches or the coding plug, to the presettable measurement result or results intended to serve as criterion for provision of the switch-off signal. As an alternative, electronic setting of the presettable measurement result or results may be effected by user input at a control button, for example in the form of a rotary switch, assigned to the control device, or at a different type of similarly usable setting facility of the control device or by means of the higher-level control unit.

In an advantageous development of the invention it is provided that the measuring device includes a timer, in particular settable, which is adapted to provide a switch-off signal at the control device after a presettable period of time. For many applications it is sufficient to ensure fluidic pressurisation of the fluidic load for a presettable period of time after switch-off of the process plant or the machining centre by means of the higher-level control unit. For this case of application the measuring device is set up to detect a period of time which starts with the triggering of the start signal and at the end of which the switch-off signal is provided to the control device, in order to activate the electro-mechanical actuating means so that the valve member is moved into the switch-off position.

In an advantageous development of the invention it is provided that the measuring device includes sensor means, which are adapted to detect a physical measured value and to provide the delay means with an electrical measuring signal based on the detected physical measured value. The detected physical measured value may involve for example a mass flow of the fluid from the valve device to the fluidic load and/or a temperature, a pressure, a position in space of an actuator element, or other physical variables which are converted by the assigned sensor means into an electrical measuring signal which is provided to the delay means in order to supply the desired switch-off signal in the presence of a presettable measurement result. Preferably it is provided that the measuring device includes several sensor means and a linking of electrical measuring signals of these sensor means is provided in order to provide a switch-off signal for example when at least two of the physical measured values of the respectively preset measurement result have been reached or exceeded, or to delay provision of the switch-off signal until for example a presettable measured value configuration is present. For example it is possible to provide a combination of a time delay with at least one further measured value, so that a switch-off signal is given only when on the one hand the preset period of time has been reached or exceeded and on the other hand the desired measured value has been set.

Preferably it is provided that the control device includes switching means which are adapted for the provision of an amount of electrical energy from the electrical energy storage to the actuating means on receipt of the switch-off signal, in order to move the valve member into a presettable functional position at the end of the valve switch-off process. Preferably the valve member and/or the actuating means are equipped with at least one biasing means, so as to ensure a non-energised retention of at least one functional position for the valve member. With the aid of the switching means assigned to the control device, the valve member may be brought from the functional position into the switch-off position, with the amount of energy needed for this purpose being provided by the electrical energy storage. Preferably the valve device is in the form of a bistable valve, so that the valve member may be moved with the aid of the electro-mechanical actuating means between a first functional position with cross-section of the fluid passage, also described as the opening position, and a second functional position with the fluid passage completely blocked, also known as the closed position and corresponding to the switch-off position. At the same time it is provided that the valve member in the closed position is held on the valve seat with sealing contact. It is also provided that the valve member is held in both functional positions without the supply of external energy, with the biasing means serving for this purpose. The biasing means may involve for example a spring device or a permanent magnet, exerting a holding force on the valve member in the respective functional position.

In a further variant of the invention it is provided that the control device and/or the delay means include an electrical charging circuit for the electrical energy storage, which is in particular in the form of a capacitor or a super-capacitor or a storage battery. With the aid of the electrical charging circuit it is possible, during normal operation of the valve device, i.e. during temporary or long-term presence of a control signal and/or a supply voltage, for the electrical energy storage to be charged, to ensure after switch-off of the supply voltage and in the absence of the control signal, the desired delayed-action switch-off of the valve device. An electrical energy storage of this kind may be based on various technologies, with advantageous embodiments involving provision of the electrical energy storage as a capacitor or super-capacitor or storage battery.

In a further variant of the invention it is provided that the control device and the delay means are constructed in the form of a microcontroller, in particular a common microcontroller. In this way it is possible to obtain a compact and energy-saving design of the control device and the delay means. This applies in particular when the control device and the delay means are in the form of a common microcontroller.

BRIEF DESCRIPTION OF THE DRAWINGS

Advantageous embodiments of the invention are shown in the drawing, which depicts in FIG. 1 a schematic view of two different embodiments of the valve device which is used to activate a fluidic load FIG. 2 a schematic detail view of a first embodiment of a valve device, and FIG. 2*a* an isolated cross-sectional view of the valve device shown in FIG. 2

DETAILED DESCRIPTION OF THE PREFERRED EMBODIMENTS

Figure 1:
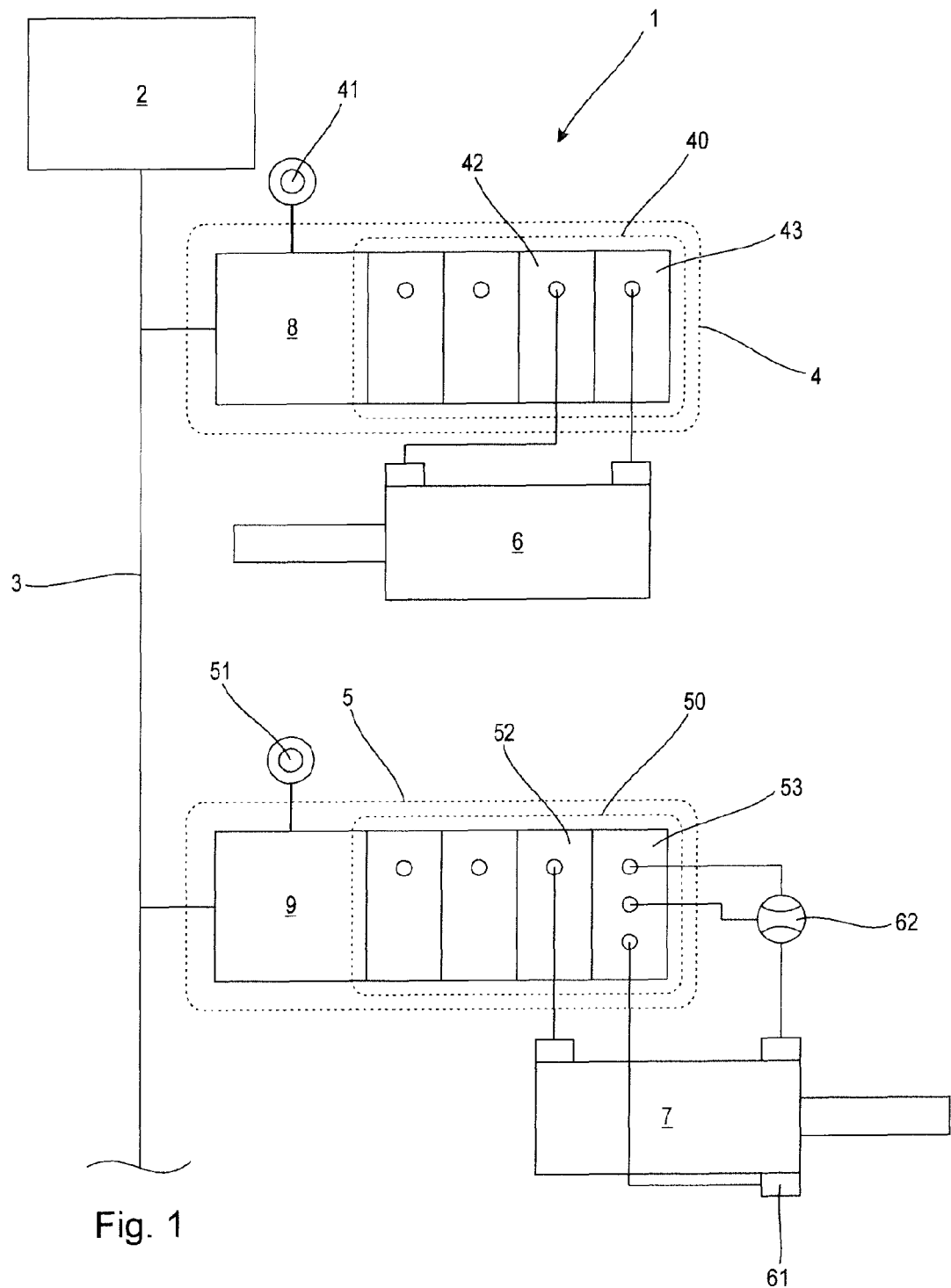

An automated system 1 shown schematically in FIG. 1, adapted for example to operate a process plant not shown in detail or to operate a machining centre not shown in detail, includes a control unit 2, a bus system 3 and several field devices 4, 5. By way of example the two field devices 4, 5 are each as an example assigned fluidic loads 6, 7 in the form of pneumatic cylinders, which are adapted to provide linear movements to the process plant or machining centre, which is not illustrated.

For operation of the automated system 1, the control unit 2 is connected via the bus system, which may involve in particular a field bus, to the field devices 4, 5, in order to facilitate provision of bus commands to the field devices 4, 5. Each of the field devices 4, 5 includes a bus connector 8, 9 which is adapted for conversion of the bus commands which the control unit 2 provides via the bus system 3. The function modules 40, 50 of the two field devices 4, 5 are by way of example fluid valves, adapted to control a fluid flow from the fluid source 41, 51 to the respectively connected fluidic load 6, 7.

Additionally or alternatively, at least one of the function modules 40, 50 may be adapted for example as an input/output module for the operation of sensor devices not shown in detail and for the detection of the sensor signals provided by these sensor devices.

By way of example it is provided that for both field devices 4, 5, the fluidic loads 6, 7 are each connected with two function modules 40. In each case one of the function modules 40, 50 is a conventional valve module 42, 52, adapted in a known manner to provide a fluid flow to the fluidic loads 6, 7 on receipt of a suitable control signal from the bus connector 8 or 9 via an internal bus system, not shown, or a single wire arrangement, also not shown, between bus connector 8, 9 and function module 40. On receipt of the relevant control signal, the valve module 42, 52 allows or interrupts a fluid flow from the respective fluid source 41, 51 to the assigned fluidic load 6, 7.

Figures 2, 2A:
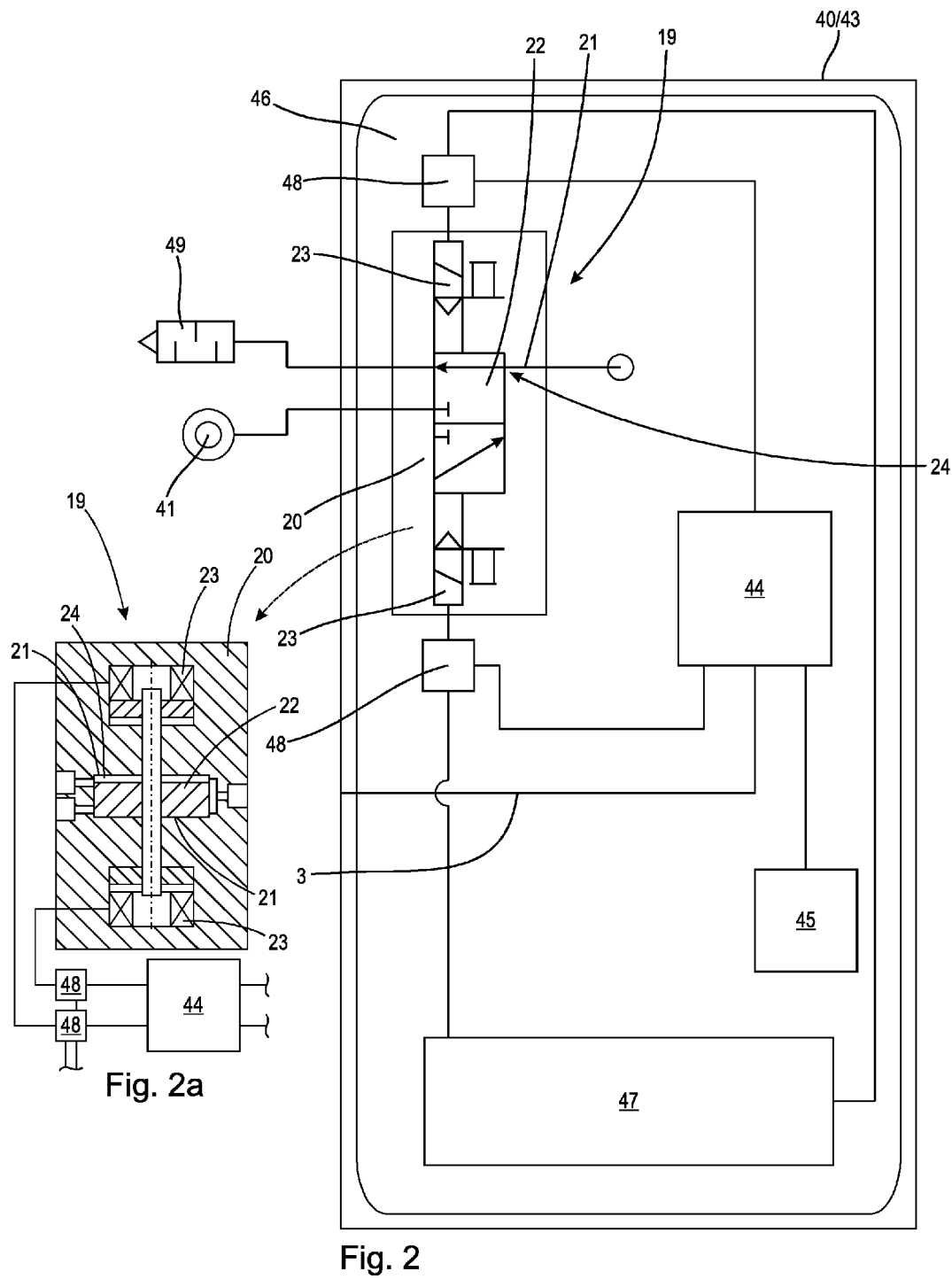
Figure 3:
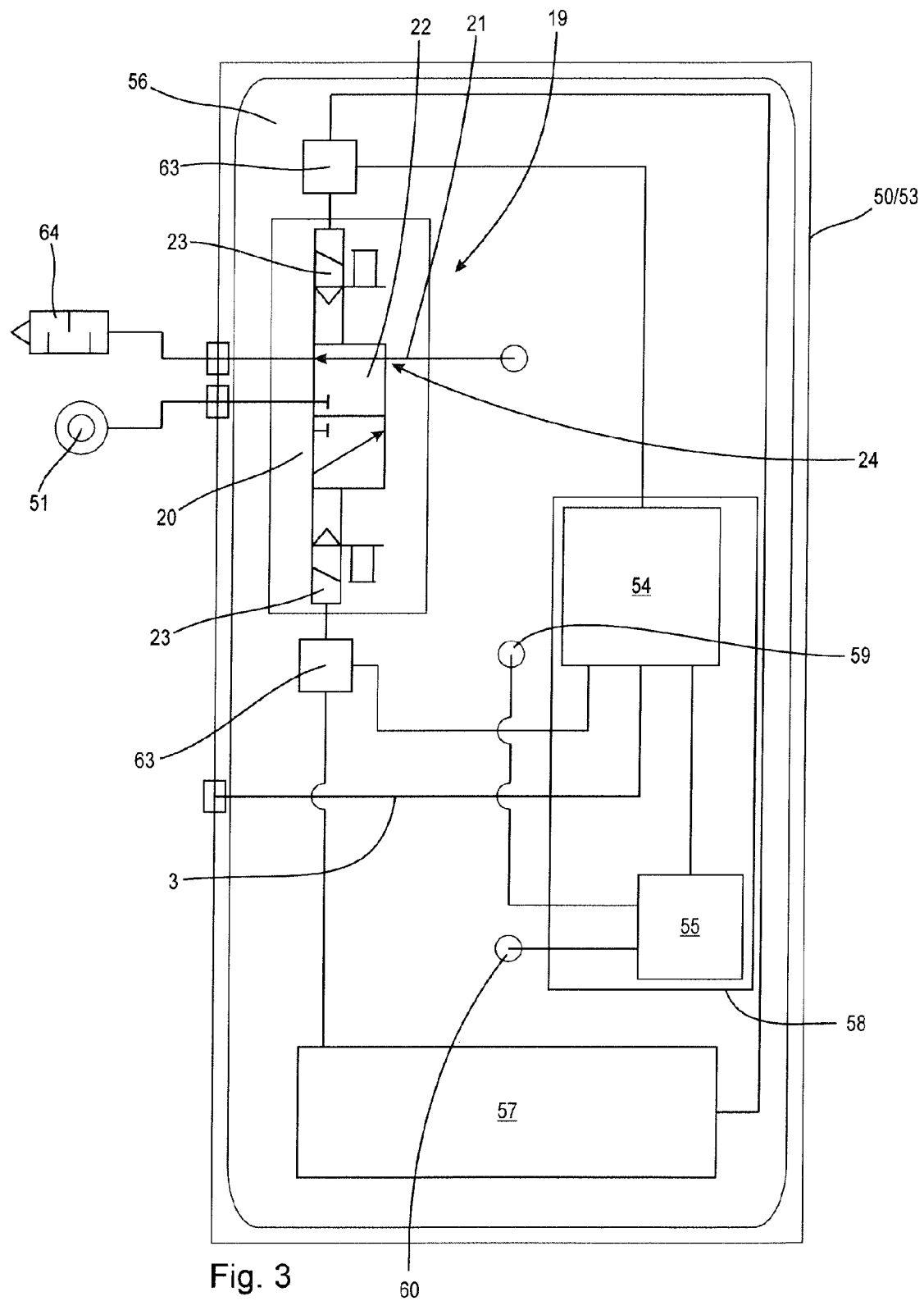
FIG. 3 a schematic detail view of a second embodiment of a valve device.

The valve devices 43 and 53, also adapted as function modules 40, 50, differ from the valve modules 42, 52 in that, in addition to the control device 44, 54, delay means 45, 55 shown in FIGS. 2, 2a and 3 are also provided. The delay means 45, 55 provide, during a valve switch-off process, for a delayed-action movement of the valve member 22 included in FIGS. 2, 2a and 3 and provided with identical reference numbers. As is evident from FIGS. 2, 2a and 3, the valve member 22 is connected to an electro-mechanical control means 23, by way of example in the form of a solenoid. In the presence of a control signal directed at the control device 44 or 54, the control means 23 may be supplied with electrical current, in order to effect a movement of the valve member 22, thus setting a cross-section of a fluid passage 21 formed in the valve body 20. In the fluid passage 21, by way of example, a valve seat 24 indicated only schematically, is so adapted that a complete blocking of the fluid passage 21 is ensured when the valve member 22, adapted in a manner not shown in detail for example as a ball-or slide valve, is in contact with the valve seat 24. By way of example, the electro-mechanical actuating means are assigned biasing means, not shown in detail and for example in the form of permanent magnets, which are so attuned to the electro-mechanical actuating means 23 and the valve member 22 that the opening position and the closed position which may be adopted by the valve member 22 are each held without the supply of additional energy.

Consequently the valve 19 represented by the valve body 20, the fluid passage 21, the valve member 22, the electrical actuating means 23 and the valve seat 24 represents a bistable operating valve which has two functional positions, each self-retaining, i.e. capable of being continuously maintained even without a supply of energy.

In the case of the valve device 43, the control device 44 and the delay means 45 are formed as separate microprocessors on a common printed circuit 46, wherein the delay means 45 are so connected electrically to the control device 44 that bi-directional communication between the control device 44 and the delay means 45 is facilitated. Also mounted on the printed circuit 46 is an energy storage 47, by way of example in the form of a super-capacitor, which is adapted for the storage of electrical energy to an extent required for the maintenance of the function of the control device 44 and the delay means 45 after switch-off of supply energy which may be provided to the printed circuit 46 over electrical wiring means, not shown, in particular by the bus connector 8.

By way of example it is provided that the control device 44, on switch-off of the supply voltage, provides a start signal to the delay means 45, which for its part includes a measuring device, not shown in detail, in the form of a timer. The measuring device may for example be in the form of a discrete area in the microprocessor or run solely as a software algorithm in the microprocessor. On receipt of the start signal from the control device 44, the measuring device executes a time measuring process and provides, on the expiry of a preset period of time, a switch-off signal to the control device 44. With the receipt of the switch-off signal at the control device 44, an amount of electrical energy storaged in the energy storage 47 is supplied by the control device 44 to the electro-mechanical actuating means 23 by means of an assigned switching means 48, which may involve for example an electronic switch such as a transistor. By this means the valve member 22 is transferred from a first functional position held without energy into a second functional position which may be held without energy, in which for example the fluid passage 21 is blocked. For setting the presettable period of time there is provided on the printed circuit 46 a setting means, not shown in detail, in particular in the form of a DIP switch (Dual In-Line Package), with which the user is able to set the period of time by adjusting the individual switch.

In the case of the valve device 53, which similarly includes a printed circuit 56 and an energy storage 47, the control device 54 and the delay means 55 are provided in a common microprocessor 58. The microprocessor 58 is in electrical contact with sensor inputs 59, 60 on the printed circuit 56. By way of example, at the sensor inputs 59 and 60 according to FIG. 1 are an end position switch 61 assigned to the fluidic load 7 to detect an end position of the moving parts of the fluidic load 7, and a flow meter 62 to determine a fluid flow in the fluidic load 7. Here it is provided, by way of example, that the delay means 55 depicted in FIG. 3, during the valve switch-off process for the valve device 53, monitor not only a sensor signal of the end position switch 61 but also a sensor signal of the flow meter 62 and, independently of a period of time which has elapsed since the receipt of the start signal, provide a switch-off signal if a moving part of the fluidic load 7, in particular a piston rod, has reached a presettable end position and a presettable mass flow has been determined with the aid of the flow meter 62.

Through suitable programming of the delay means 55, it is possible to make almost any desired combination of logical links between signal levels at the sensor inputs 59, 60 and also where applicable at other sensor inputs, not shown, also if applicable a link with the timer. With this it is possible to ensure that a rinsing process for the fluidic load 7 connected to the valve device 53 is terminated only under exactly preset boundary conditions and is otherwise maintained.

Due to the design of the valve 19 as a bistable valve, the electrical energy stored in the relevant energy storage 47, 57 is provided in the case of the valve device 53 for the monitoring of the sensor inputs 59, 60, and in the case of the two valve devices 43 and 53 for operation of the control device 44, 54 and the delay means 45, 55. The energy stored in the energy storage 47, 57 must also at least be adequate for a switching process of the electromechanical actuating means 23.

In an embodiment, not illustrated, of a valve device, the control device and/or the delay means may be assigned a communications device for wireless receipt and/or wireless transmission of control and/or status signals with the aid of which, after switch-off of the control device and the supply voltage, communication may take place between adjacent field devices for the purpose of a synchronised switch-off.

The invention claimed is:

1. A valve with a valve housing, through which passes a fluid passage, in which are formed a valve seat and a valve member accommodated so that the valve member may be moved relative to the valve seat, with an electro-mechanical actuating means for moving the valve member between at least two functional positions in order to influence a cross-section of the fluid passage, and with a control device which is adapted to activate the actuating means on the basis of a control signal and which includes delay means which, in connection with a valve switch-off process, are adapted for delayed-action movement of the valve member into a switch-off position, wherein the control device and the delay means are adapted as electrical circuits and include an electrical energy storage which, in the case of a valve switch-off process, is adapted for an energy-autarkic movement of the valve member into the switch-off position.

2. The valve device according to claim 1, wherein the control device is adapted to provide a start signal to the delay means on receipt of a switch-off control signal or in the absence of a control signal and/or with switch-off of a supply voltage, in order to initiate the valve switch-off process.

3. The valve device according to claim 2, wherein the delay means include a measuring device which is adapted for the provision of a switch-off signal to the control device in the presence of a presettable measurement result.

4. The valve device according to claim 3, wherein the control device and/or the delay means are or is assigned setting means, which are adapted for setting of the presettable measurement result for provision of a switch-off signal.

5. The valve device according to claim 3, wherein the measuring device includes a timer, which is adapted to provide a switch-off signal to the control device after a presettable period of time has elapsed.

6. The valve device according to claim 3, wherein the measuring device includes sensor means which are adapted to detect a physical measured value and to provide an electrical measuring signal to the delay means based on the detected physical measured value.

7. The valve device according to claim 3, wherein the control device includes switching means which are adapted to provide an amount of electrical energy from the electrical energy storage to the actuating means on receipt of the switch-off signal, in order to move the valve member into a presettable functional position at the end of the valve switch-off process.

8. The valve device according to claim 1, wherein the valve member and/or the actuating means are equipped with at least one biasing means, in order to ensure a non energised maintenance of at least one functional position for the valve member.

9. The valve device according to claim 1, wherein the control device and the delay means include an electrical charging circuit for the electrical energy storage.

10. The valve device according to claim 1, wherein the control device and the delay means are constructed in the form of a microcontroller.

11. The valve device according to claim 10 wherein the control device and the delay means comprise a common microcontroller.

12. The valve device according to claim 9, wherein the electrical energy storage is constructed in the form of a capacitor or super-capacitor or storage battery.

* * * * *